Jan. 6, 1925.
G. WALTHER
WHEEL
Filed April 8, 1922   3 Sheets-Sheet 1
1,521,661
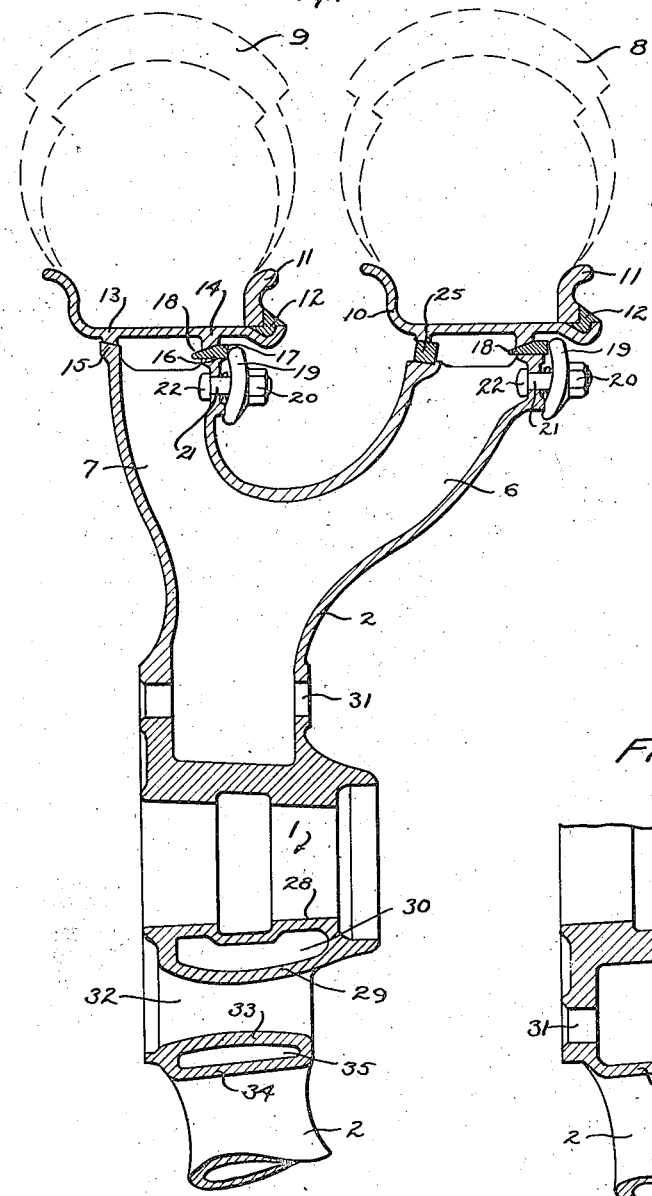
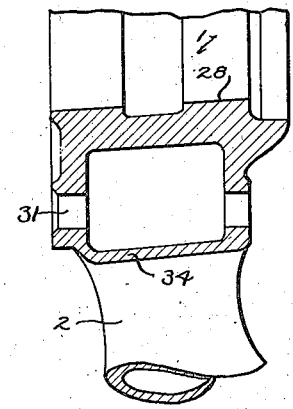
Inventor
George Walther
By Toulmin & Toulmin
Attorneys

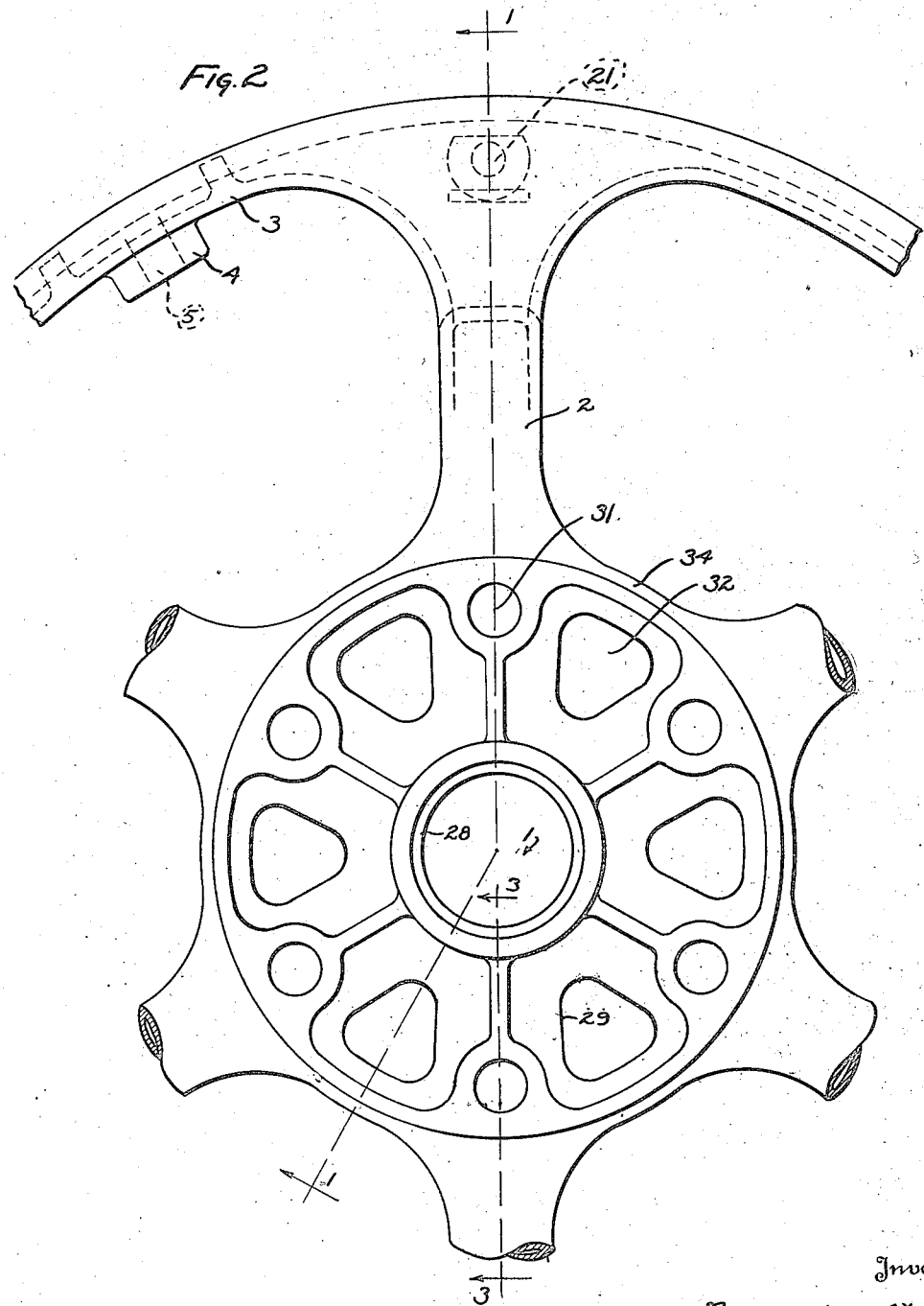

Jan. 6, 1925.

G. WALTHER

WHEEL

Filed April 8, 1922

Inventor
George Walther
By Toulmin & Toulmin
Attorneys

Patented Jan. 6, 1925.

1,521,661

UNITED STATES PATENT OFFICE.

GEORGE WALTHER, OF DAYTON, OHIO, ASSIGNOR TO THE DAYTON STEEL FOUNDRY COMPANY, OF DAYTON, OHIO, A CORPORATION OF OHIO.

WHEEL.

Application filed April 8, 1922. Serial No. 550,836.

*To all whom it may concern:*

Be it known that I, GEORGE WALTHER, a citizen of the United States, residing at Dayton, in the county of Montgomery and State of Ohio, have invented certain new and useful Improvements in Wheels, of which the following is a specification, reference being had herein to the accompanying drawing.

My invention relates to wheels and in particular to cast steel wheels adaptable to mounting and carrying dual tires.

The object of my invention is to provide a wheel susceptible of mounting a plurality of tires thereon. It is a further object of providing a cast steel wheel for this purpose or a cast wheel of any other material which may be found suitable.

It is an additional object to provide a wheel so designed and so arranged as to distribute the load on both tires and distribute the load properly on the hub and therefore upon the axle. It is an object to provide a hollow spoke rim and hub wheel adapted for carrying a plurality of tires.

It is an additional object to provide such a wheel so that the tires may be mounted upon demountable rims and the rims and the tires applied as a unit when the tires are inflated. It is an object to arrange the wheels so that these tires may be applied one after the other and may be rigidly fastened by detachable members to the wheel.

It is a further object to provide the wheel with suitable apertures for the passage therethrough of the valve stems for the inner tubes for the pneumatic tires and to so arrange the wheel that when the demountable rim and tire is mounted thereon the valve tube may be readily inserted and positioned.

Referring to the drawings:

Fig. 1 is a section taken vertically through the wheel showing the location of the tires in dotted lines and showing the rims and retaining members in section. This section is taken on the line 1—1 of Fig. 2;

Fig. 2 is a side elevation of the wheel with a portion of the spokes and rim cut away;

Fig. 3 is a section on the line 3—3 of Fig. 2, showing the arrangement of the hollow hub;

Figure 4:
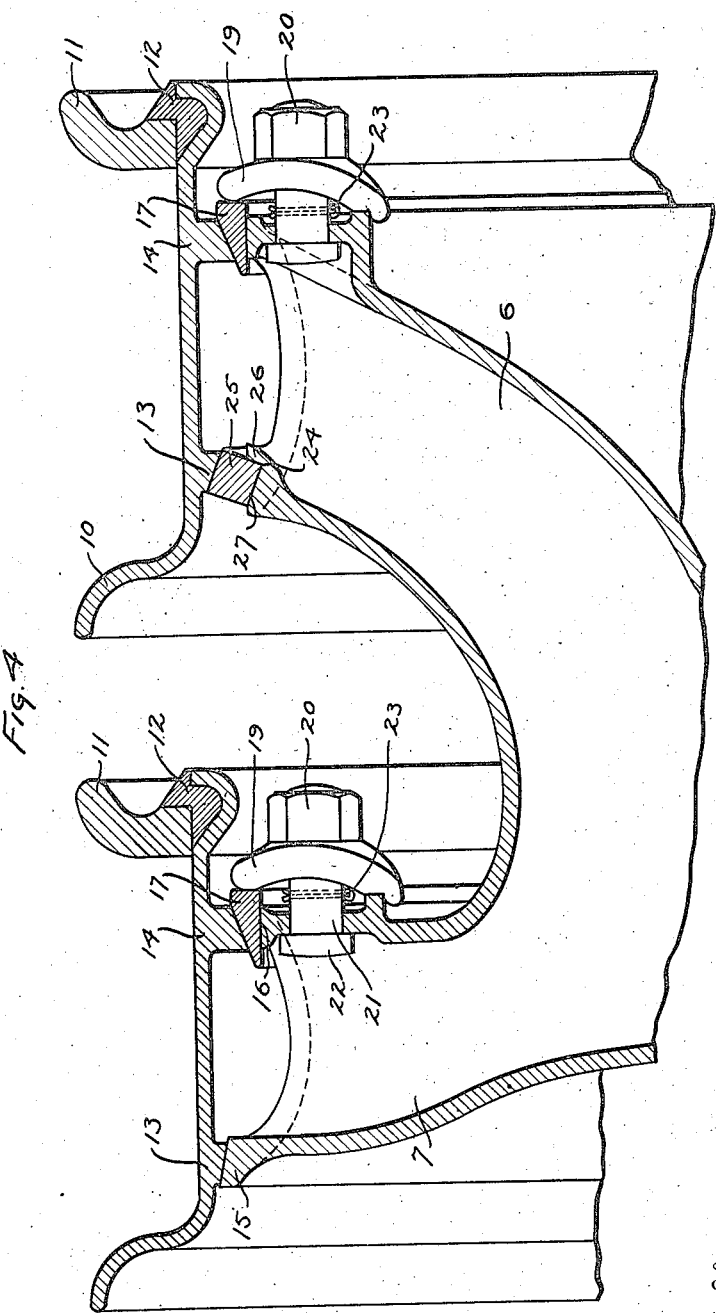
Fig. 4 is an enlarged view in section of the rim portion and outer spoke ends shown in Fig. 1.

Referring to the drawings in detail, there will be seen a cast steel wheel of integral construction consisting of a hub portion that is hollow, hollow spokes and a hollow rim.

The hub is designated 1, the hollow spokes generally designated 2 and the hollow rim is generally designated 3. The rim is provided with a portion that is of increased thickness as at 4 through which is projected the aperture 5 to accommodate the valve stem of the tire.

The spokes are divided into two members 6 and 7 respectively carrying the outer and the inner tire shown in dotted lines at 8 and 9. These tires are mounted upon demountable rims 10 retained in place by the rings 11 and 12. The bottom or inner side of the demountable rim 10 is provided with beads or shoulders 13 and 14. The bead at the right hand is heavier or deeper than the one at the left hand. They are tapered in opposite directions. That is, these tapers are coactingly arranged. On the outer rim of the wheel there is a corresponding tapered surface sloping inwardly towards the inner side of the spoke as at 15. The other wall of the rim at 16 is lower than the wall 15 and is flat. A wedging ring 17 having a tapered surface 18 to fit the tapered surface 14 is interposed between 16 and 14 and retained in place by the lugs 19 and the bolts and nuts 20. These bolts are passed through the apertures 21 in the spokes having their heads on the inside of the hollow spokes as at 22. They are retained in position by the cotter pins 23 which prevent the bolts from being lost out of the wheel due to the fact that the cotter pin prevents their moving in one direction and the head 22 prevents their moving in the other direction.

In placing the tires on the wheel the inner tire is placed on first. For that reason the rim of the outer series of spokes must be low enough to permit of the passage of the ring 17 over the rim and spoke ends.

In view of the fact that the outer spokes 6 are therefore lower it is necessary to provide a means of locking the outside rim and tire on the outside spokes at the same level at which the inside tire and rim are locked.

This is accomplished by providing the entire wall of the outside rim of the outside spokes with a groove 24 in which a ring 25, square in cross section, fits. This V-shaped groove has a short wall 26 on the outside and a long wall 27 on the inside, the wall 26 being at a sharp angle and the inner wall being at a lesser angle.

The angularity of the wall 27 is necessarily equal to that of the bevel of the shoulder 13 as these parts 13 and 27 are parallel to one another being on opposite sides of the square ring 25. This arrangement, when locked in position by the ring 17 and the lugs 19, in co-operation with the bolts 20, securely locks the outside rim on the same level as the inside rim.

It will be noted that these spokes and therefore the rims are so arranged that the load is equally distributed on both tires and the load is equally distributed on the wheel structure so that there will be no undue tilting or wabbling of the wheel in operation due to uneven load upon the axle, the hub and the bearings.

Referring in detail to the hub, it will be seen that there is an inner wall 28, an outer wall 29 and a space therebetween designated 30. Bolt holes 31 are provided for the attachment of brake drums to these wheels.

It will be further noted that in this dual wheel construction I have provided a wheel having broadly sweeping curves where the spokes emerge from the hub and where the spokes merge into the rim.

It will be further noted that I have provided a light but very strong weblike structure between the hub proper and the final point of departure of the spokes from the hub. I have provided openings 32. These openings are defined by the wall 29 on the one side and the wall 33 on the other side. Between 33 and its adjacent wall 34 is an annular space 35.

This arrangement gives a very light and strong construction with the minimum weight due to the minimum amount of metal, provides ample surface for the attachment through the apertures 31 of the brake drum, and provides a very powerful seating for the spokes with the minimum of leverage and the minimum of opportunity for fracture or breakage as a consequence.

It will also be observed that this wheel is so arranged that it can be mounted upon existing automotive vehicles or the like without disturbing the design of the chassis of frame or design of the body.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, in a wheel, a hub and integral spokes and demountable rims, said spokes having their outer ends diverging and on different levels, and means between the ends of the spokes and said rims adapted to retain thereon tires in parallel relationship and at the same level.

2. In combination, in a wheel, hollow spokes, and detachable rims, said spokes having their outer ends diverging in pairs and terminating inwardly in an integral hub, said rims being adapted to retain thereon tires in parallel relationship, said tires being arranged to be retained on the same level with respect to one another.

3. In combination, a wheel consisting of rims, spokes having laterally bifurcated ends and terminating inwardly in a hub, the inner walls of the inner bifurcated ends of the spokes being located at points higher than the other walls of the same bifurcated ends of the spokes and the other walls of the other bifurcated ends of the spokes.

4. In combination, a wheel consisting of rims, spokes having laterally bifurcated ends and terminating inwardly in a hub, the inner walls of the inner bifurcated ends of the spokes being located at points higher than the other walls of the same bifurcated ends of the spokes and the other walls of the other bifurcated ends of the spokes, the outer edges of the outer walls of the inner bifurcated ends of the spokes being on substantially the same level as the outer walls of the outer bifurcated ends of the spokes.

5. In combination, a wheel consisting of rims, spokes having laterally bifurcated ends and terminating inwardly in a hub, the inner walls of the inner bifurcated ends of the spokes being located at points higher than the other walls of the same bifurcated ends of the spokes and the other walls of the other bifurcated ends of the spokes, the outer edges of the outer walls of the inner bifurcated ends of the spokes being on substantially the same levels as the outer walls of the outer bifurcated ends of the spokes, but not as high as the inner walls of the inner bifurcated ends of the spokes.

6. In combination, in a wheel, a hub, a plurality of spokes arranged therearound with their outer ends diverging and rims carried by said spokes parallel to one another, said spokes having outer and inner walls, the inner walls being tapered and the outer walls having surfaces substantially parallel to the major axis upon which the wheel is mounted.

7. In combination, in a wheel, a hub, a plurality of spokes arranged therearound with their outer ends diverging and rims carried by said spokes parallel to one another, said spokes having outer and inner walls, the inner walls of the ends of the spokes being tapered and the outer walls having a surface substantially parallel to the major axis upon which the wheel is mounted, the inner tapered wall of each of the spokes having its inner edge higher than its outer edge.

8. In combination, in a wheel, a hub, a plurality of spokes arranged therearound with their outer ends diverging and rims carried by said spokes parallel to one another, said spokes having outer and inner walls, the inner walls of the ends of the spokes being tapered and the outer walls having surfaces substantially parallel to the major axis upon which the wheel is mounted, the inner walls of the inner ends of the spokes being higher than the other walls of either ends of the spokes.

9. In combination, in a wheel, a hub, a plurality of spokes mounted thereon and having bifurcated ends in pairs one end on the inside and one on the outside of the wheel, the outer ends of each spoke terminating in spaced walls, said walls being adapted to receive demountable rims and locking means on said bifurcated spoke ends to lock said demountable rims on the spokes.

10. In combination, in a wheel, a hub, a plurality of spokes mounted thereon and having laterally diverging outer ends, one on the inside and one on the outside of the wheel, the outer ends of each of the spokes terminating in spaced walls, said walls being adapted to receive demountable rims and locking means carried by said spoke ends to lock said demountable rims on the spokes, said locking means comprising a tapered ring between the inside of the demountable rim, and the outer walls of the spoke ends, said locking ring being held in engagement by a plurality of bolts and lugs carried by the spokes, the other demountable rim being locked in position in a similar manner, with the exception that the inner walls of the outer spoke ends have beveled grooves in which a locking ring is adapted to fit with a tapered surface to engage with the corresponding tapered ring on the inner side of the demountable rim.

11. In combination, a hollow hub, spokes and rims, said spokes having outwardly diverging ends with rims carried thereby parallel to one another, said outer ends being so arranged for the retention thereon in locking engagement of demountable rims and being so arranged that the inner series of spokes and inner rim will receive its demountable rim first, means to lock said demountable rim on said spokes, means on said demountable rims for carrying tires, means on said rims to accommodate the valve stem of said tires between said spokes.

In testimony whereof I affix my signature.

GEORGE WALTHER.